Feb. 14, 1950  G. R. HENNEY  2,497,818
MEAT CUTTING GAUGE
Filed Oct. 18, 1945

INVENTOR.
Grover R. Henney
BY
R. G. Story
ATTORNEY

Patented Feb. 14, 1950

2,497,818

UNITED STATES PATENT OFFICE 2,497,818

MEAT CUTTING GAUGE

Grover R. Henney, Chicago, Ill., assignor to Swift & Company, Chicago, Ill., a corporation of Illinois.

Application October 18, 1945, Serial No. 623,153

3 Claims. (Cl. 33—189)

This invention relates to improvements in gauges and has particular reference to a gauge for use in cutting meat, especially beef, in accordance with official specifications for standard cuts. The invention, however, is not to be considered as limited to any special use but as for an improved gauge device for any use for which it may be found to be adapted.

Specific specifications are often authorized for the preparation of standard commercial cuts of meat.

These specifications are definite and exact and it is apparent that an attempt to prepare standard meat cuts according to these specifications relying on visual estimates of dimensions would result in failure to comply specifically with the specifications and in large variations between standard cuts having the same specification.

It is therefore an object of the present invention to provide a simple and inexpensive gauge device by means of which the specified dimensions may be quickly and easily determined by the meat cutter preparing the cuts for commercial distribution.

A further object resides in the provision of an improved gauge device of the character indicated which combines in one instrument all the necessary dimensions for preparing a standard cut of meat according to official specifications.

A still further object resides in the provision of an improved gauge of the character indicated by means of which the verious required dimensions may be quickly and easily determined without the necessity of highly developed skill on the part of the operator.

Other objects and advantages will become apparent from the following description taken with the accompanying drawing and from the appended claims.

Figure 1:
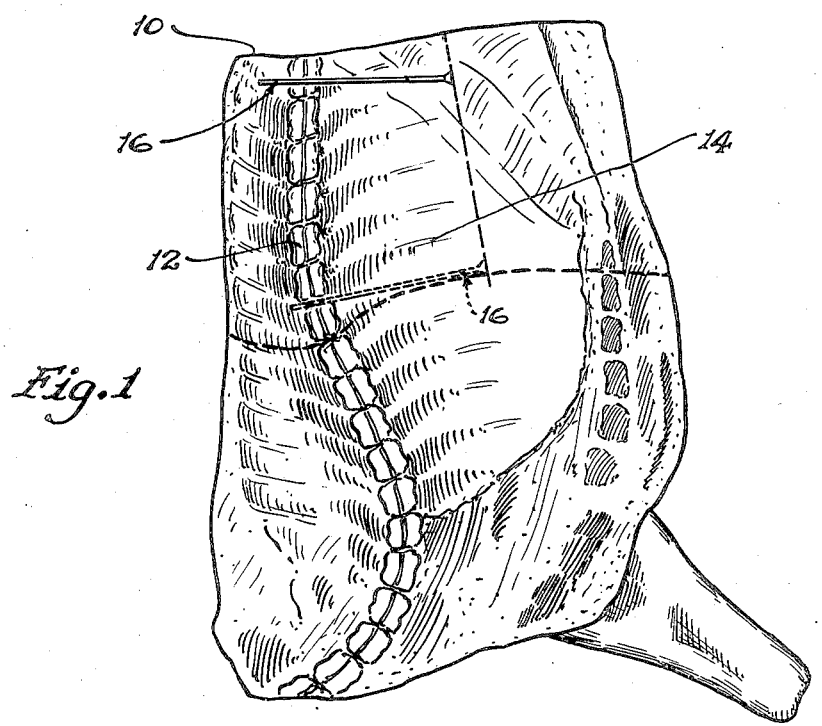
Figure 2:
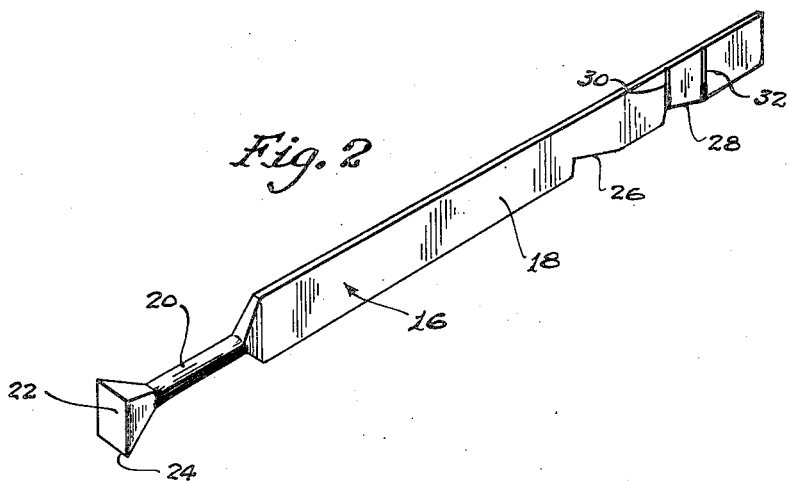

In the accompanying drawing in which like reference numerals are used to indicate similar parts throughout, Figure 1 is a plan view of a front quarter of beef showing the manner in which the improved gauge may be utilized to determine the proper dimensions for a standard rib cut; and Figure 2 is a perspective view of the improved gauge.

With continued reference to the drawing, the beef quarter, generally indicated at 10, has along one edge thereof a series of articulated vertebrae 12 to which corresponding ribs 14 are connected and extend through the beef quarter.

The gauge, generally indicated at 16 and shown in operative position in Figure 1 and in detail in Figure 2, comprises a flat bar portion 18 having at one end an extension 20 of rounded or circular cross-section terminating in a head 22 of somewhat pyramidal shape provided with a cutting or marking edge 24 along one side of its base portion. At its end opposite the marking head 22, the bar portion 18 is provided along the edge corresponding to the marking edge 24 with a pair of notches as indicated at 26 and 28 which are located a definite specified distance from the cutting edge 24 in accordance with the dimensions set forth in the standard specifications. The bar also has upon one or both sides thereof additional indicia 30 and 32 in the form of grooves or scratches cut or etched into the surface of the bar.

In using the improved gauge as a measuring tool for determining the proper dimensions of a standard rib cut, the notch 28 is placed on the center of the inside protruding edge of the twelfth thoracic vertebra and a mark is scribed with the edge 24 on the inside of the twelfth rib. This operation is repeated on the sixth rib and the sixth thoracic vertebra. The two marks thus made with the scribing edge 24 are then connected by a straight line which defines the cutting line at which the rib cut is severed from the adjacent short plate cut. The other dimensions on the strip such as the notch 26 and the indicia 30 and 32 are used in various operations such as the preparation of "oven-prepared ribs" and in trimming fat and determining other prescribed dimensions. In the device shown, the mark 32 is one inch from the adjacent end of the gauge and the mark 30 is two inches from the same end of the gauge, the notch 28 is exactly ten inches from the end of the scribing edge 24 and the notch 26 is eight inches from the edge 24. These dimensions, however, may be varied as may be convenient or necessary without in any way exceeding the scope of the invention.

The invention provides a simple and inexpensive measuring device by means of which the prescribed dimensions of a standard meat cut may be quickly and easily determined by an operator without the necessity of highly developed skill and which combines a large number of useful dimensions in a single instrument.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and language of equivalency of the claims are therefore intended to be embraced therein.

I claim:

1. A meat cutting gauge comprising an elongated flat bar portion, a scribing head at one end of said bar portion, and a portion of generally circular cross section between said bar portion and said head, said bar portion having a notch in one edge thereof at a prescribed distance from said head, and said head being generally pyramidal in form and having a scribing edge along at least one side of its base portion.

2. A gauge as defined in claim 1 wherein said bar portion is provided with measuring indicia along one side of the bar on the end portion opposite said head.

3. A gauge as defined in claim 1 wherein said bar portion is provided with measuring indicia along one side of the bar on the end portion thereof opposite said head including a second notch in the same edge and spaced from said first mentioned notch.

GROVER R. HENNEY.

REFERENCES CITED

The following references are of record in the file of this patent:

UNITED STATES PATENTS

| Number | Name | Date |
|---|---|---|
| 363,331 | Hammer | May 17, 1887 |
| 1,021,692 | McAnelly | Mar. 26, 1912 |
| 1,826,807 | McDanel | Oct. 13, 1931 |
| 1,959,022 | Donahoe | May 15, 1934 |
| 2,044,841 | Fredberg et al. | June 23, 1936 |
| 2,245,350 | Marshall | June 10, 1941 |